United States Patent [19]
Ostrow

[11] 3,945,449
[45] Mar. 23, 1976

[54] WHEELED ATTACHMENT FOR A CHAIR
[76] Inventor: Henry J. Ostrow, 218 E. Thomas St., Arlington Heights, Ill. 60004
[22] Filed: Jan. 31, 1975
[21] Appl. No.: 546,102

[52] U.S. Cl. .......... 180/6.5; 180/65 A; 180/DIG. 3; 280/35; 280/242 WC
[51] Int. Cl.² .................... B62D 11/04; B62M 1/14
[58] Field of Search ...... 280/35, 242 WC, 250, 211; 180/6.5, 65 R, 65 A, DIG. 3

[56] References Cited
UNITED STATES PATENTS

| | | | |
|---|---|---|---|
| 1,853,318 | 4/1932 | Peters | 280/35 |
| 2,798,565 | 7/1957 | Rosenthal et al. | 180/DIG. 3 |
| 2,869,686 | 1/1959 | Glanz | 280/242 WC |
| 2,961,250 | 11/1960 | Beach | 280/35 |
| 3,533,484 | 10/1970 | Wood | 180/65 R |
| 3,802,524 | 4/1974 | Seidel | 280/35 X |

FOREIGN PATENTS OR APPLICATIONS
1,540,324   8/1968   France .......................... 180/DIG. 3

Primary Examiner—Robert R. Song
Assistant Examiner—John A. Pekar

[57] ABSTRACT

A generally rectangularly shaped support frame provided with ground-engaging wheels upon which almost any type and size of conventional chair may be readily mounted so as to provide mobile means for transporting non-ambulatory persons; certain of the ground engaging wheels are capable of being rotated manually by the person using the converted wheel chair in order to propel the chair in two embodiments of the invention, electrically in a third embodiment and selectively manually or electrically or both manually or electrically in a fourth embodiment thereof; a retractible foot rest is also incorporated in the support frame.

17 Claims, 14 Drawing Figures.

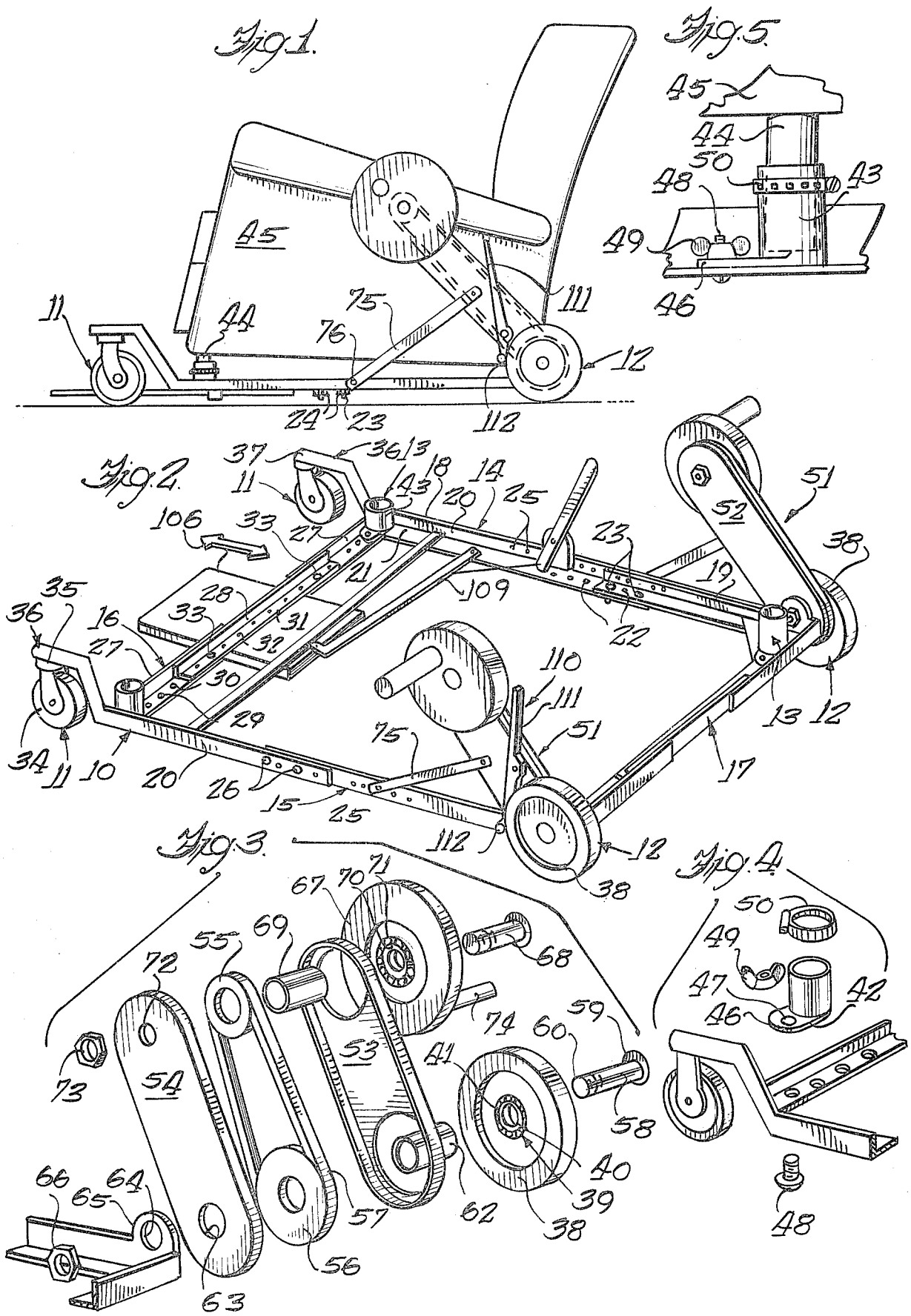

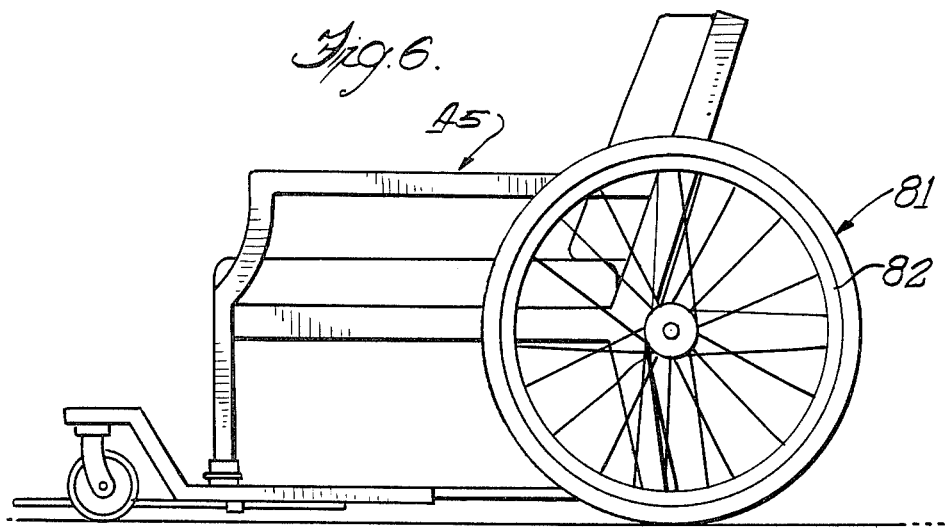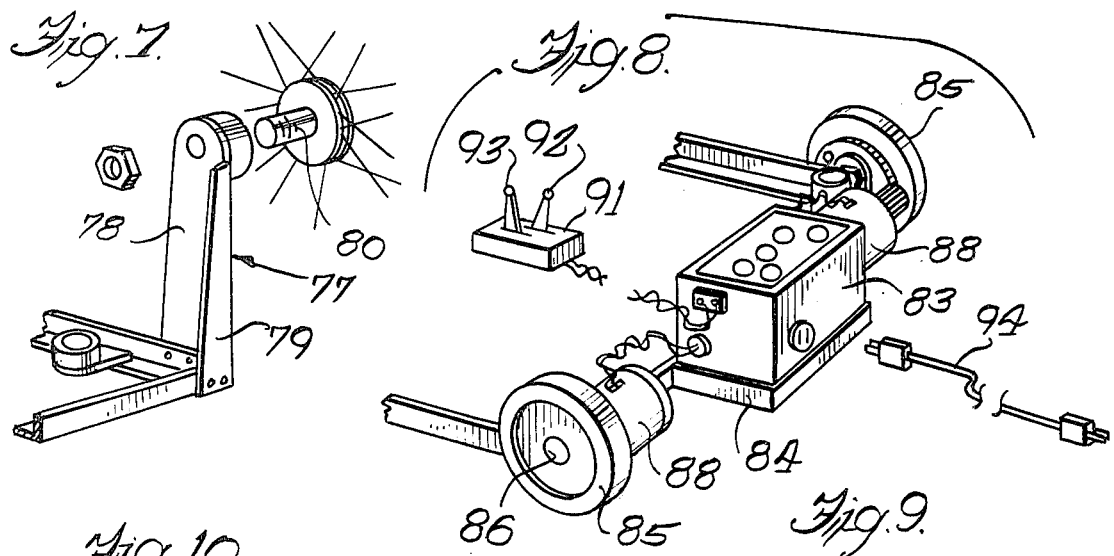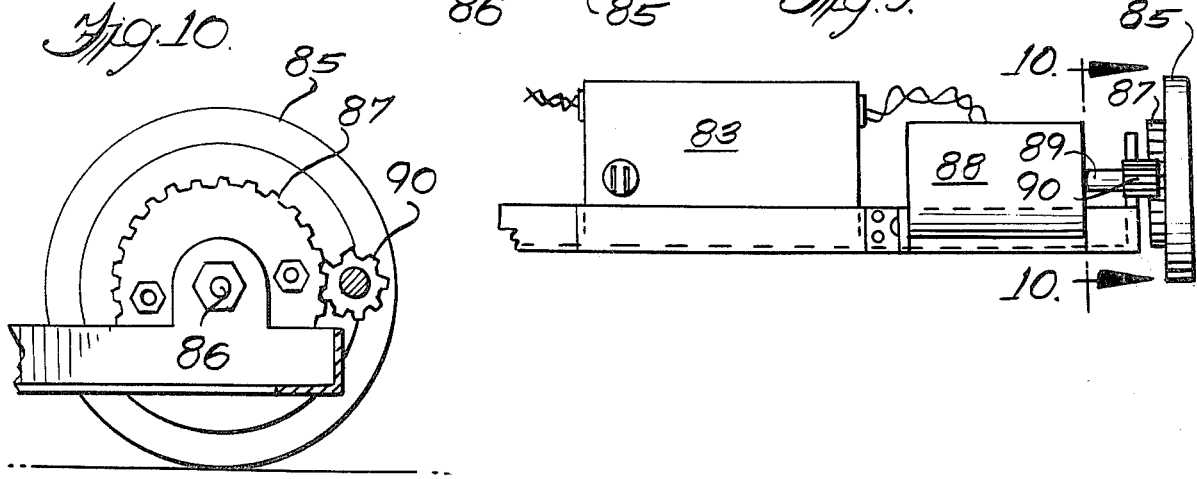

WHEELED ATTACHMENT FOR A CHAIR

BACKGROUND OF THE INVENTION

This invention relates to a new and improved wheeled attachment for adapting a conventional household chair for use by a non-ambulatory person and more particularly, to the construction of a relatively light weight and low cost wheel chair support attachment which embodies certain adjustable features whereby conventional chairs of various types, styles and sizes may be readily converted to a wheel chair.

Heretofore, various wheeled attachments for converting a chair into a wheel chair similar to the present invention have been proposed. Examples of such wheeled attachments are disclosed in the following U.S. Pat. Nos.: 1,700,009; 1,189,053; 2,961,250; 3,041,081; 3,216,738; and 3,216,738. However, certain of the wheeled attachments of the above-identified patents are non-adjustable and, consequently, they can only be used in conjunction with chairs of a particular size. Some of the prior art wheeled attachments to which the present invention relates also lack any means for enabling the person utilizing the converted wheel chair either to propel himself or to guide the chair without any assistance from other persons.

SUMMARY OF THE INVENTION

Accordingly, it is a primary objective of the present invention to provide a wheeled support frame capable of being quickly adjusted so as to accommodate chairs of a multitude of sizes and types and which substantially obviates the foregoing and numerous other shortcomings inherent in prior art chair dollies.

Briefly, the present invention contemplates the provision of a generally rectangularly shaped chair support frame, the length and width of which are quickly and easily adjustable. The chair support frame is provided with a ground-engaging wheel at each of its four corners. The chair support frame also carries means for detachably connecting a respective leg portion of a chair firmly thereto at each of its four corners.

In one form of the invention, the two rear ground-engaging wheels are electrically powered whereas in two other embodiments of the invention, the drive wheels of the support frame are capable of being rotated manually by the person seated upon the wheel chair.

A foot rest of substantial area is also provided for supporting the feet of the person utilizing the wheel chair. The foot rest may be retracted to an inoperative, substantially concealed position when not needed as when a person is being placed on or removed from the wheel chair.

A further object of the invention is to provide a light weight, yet sturdily constructed, attachment for converting a conventional household chair to a wheel chair.

A still further objective is to provide a novel belt and pulley means for manually propelling the converted wheel chair.

A further object is to provide a chair support frame which may be quickly and easily adjusted to accommodate and attach to the underside of a conventional household chair and which adjustment and accommodation do not require the use of any special tools or the like and do not result in the marring of the chair or prevent it from being subsequently used in a conventional manner once the attachment is detached therefrom.

The foregoing and other important objects and desirable features inherent in and encompassed by the invention, together with many of the purposes and uses thereof, will become readily apparent from a reading of the ensuing description in conjunction with the annexed drawings, in which:

DESCRIPTION OF THE DRAWINGS

FIG. 1 is a side elevational view of a chair support frame attachment embodying the invention attached to a conventional lounge chair;

FIG. 2 is a perspective view of the chair support frame attachment with the chair removed;

FIG. 3 is an exploded perspective view of the hand operated propelling mechanism on one side of the chair support attachment;

FIG. 4 is an exploded perspective view of one corner of the chair support attachment illustrating in detail the means for attaching a chair leg thereto;

FIG. 5 is a front elevational view of the structure shown in FIG. 4 in conjunction with a chair leg;

FIG. 6 is a side elevational view of a second embodiment of the invention;

FIG. 7 is a perspective view of one rear corner of the chair support attachment shown in FIG. 6;

FIG. 8 is a perspective view of the rear half of the chair support attachment of a third embodiment of the invention wherein electric propulsion means are employed;

FIG. 9 is a rear elevational view of a portion of the structure illustrated in FIG. 8;

FIG. 10 is a vertical sectional view taken substantially along line 10—10 of FIG. 9;

DETAILED DESCRIPTION OF THE PREFERRED EMBODIMENTS OF THE INVENTION

Figure 11:
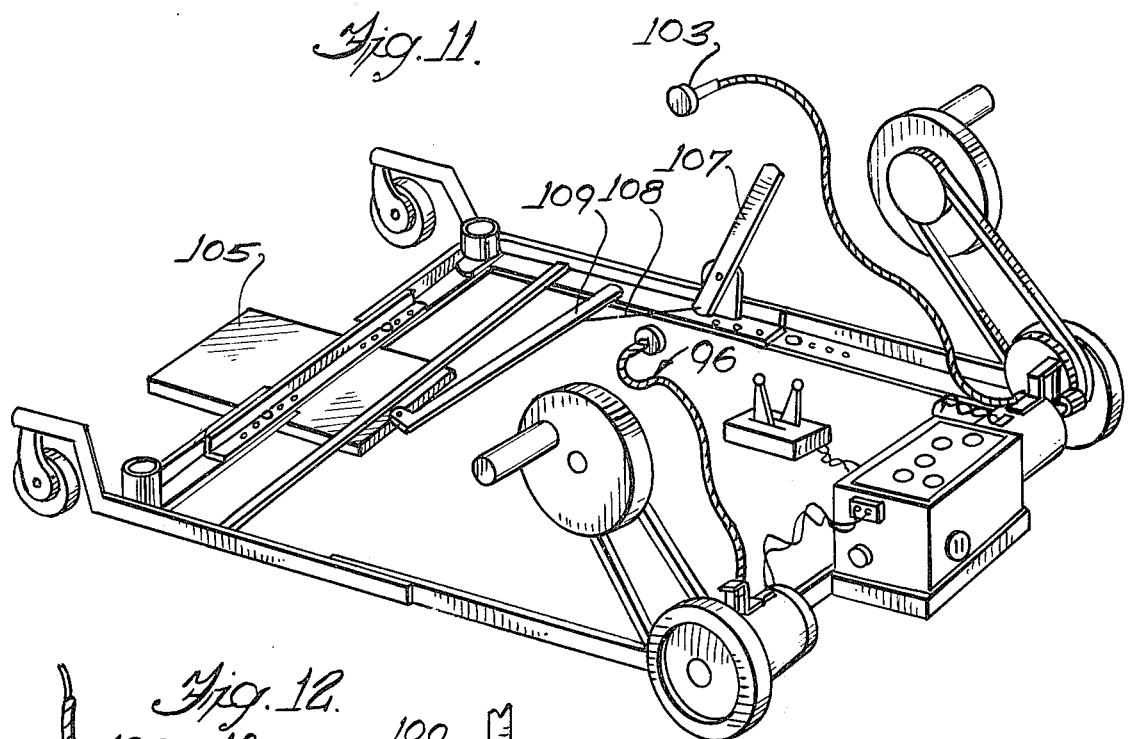
FIG. 11 is a view similar to FIG. 2 illustrating a fourth embodiment of the invention.

Referring to the drawings in detail, wherein like reference characters represent like elements throughout the various views, the wheeled chair support attachment for converting a conventional chair into a wheel chair for non-ambulatory persons includes a chair support frame, designated in its entirety by reference numeral 10. Basically, the attachment of the present invention, in addition to the frame 10, which is substantially rectangular in form when viewed in plan, further includes wheel means 11 at each of its front corners of the caster type as well as drive wheel means 12 at each of its rear corners. The basic attachment of the present invention also includes means 13 at each of the four corners of the chair support frame 10 for detachably securing the legs of a conventional household chair to the attachment.

The chair support frome 10 is formed of a pair of transversely spaced, longitudinally extending side sill members 14, 15, which are substantially mirror images of each other, a front end sill member 16, and a rear end sill member 17. The front end sill member 16 is longitudinally spaced and substantially parallel with respect to the rear end sill member 17.

As pointed out hereinbefore, one of the prime objectives of the present invention is to provide a wheel chair support attachment which is readily adaptable to fit a large variety of chairs of many different sizes. This objective is achieved partially by making the length and width of the chair support frame 10, variable and such length and width variation is, in turn, accomplished by constructing the front, rear, and side sill members 16, 17, 14, 15, respectively, in such a manner that the overall length of each is individually adjustable.

The side sill members 14, 15, which are substantially mirror images of each other, each include an elongated front section 18 and a cooperating elongated rear section 19. The front and rear sections 18, 19, respectively, are preferably made of conventional angle iron stock. Thus, each section 18, 19 is substantially L-shape in vertical section. As best shown in FIG. 2, an end portion of each rear section 19 overlaps and slidingly engages on end portion of a related front section 18.

The front and rear sections 18, 19, respectively are arranged to mate and to be releasably secured to the other in any of a number of longitudinal adjustments, as evidenced by viewing FIG. 2. The outwardly facing surface of the vertically disposed leg or flange 20 of the rear section 19 is adapted to slidingly engage the inwardly facing surface of the vertically disposed leg or flange 20 of the front section 18 and, similarly, the downwardly facing surface of the horizontally disposed leg or flange of the rear section 19 is adapted to slidingly engage the upwardly facing surface of the horizontally disposed leg or flange 21 of the front section 18. A plurality of longitudinally spaced apertures 22 are formed through the horizontally disposed leg 21 of both the front and rear sections 18, 19, respectively. The interval between the apertures 22 provided in the front section horizontal leg 21 is the same as the interval between the apertures 22 formed through the rear section horizontal leg 21 and each interval represents a single increment of longitudinal adjustment. From the foregoing, it is believed apparent that in order to adjust the overall length of a side sill member 14 or 15, the front and rear sections 18 and 19, respectively, are slid relatively to each other until the desired length is obtained and at least one pair of apertures 22 in the front section horizontal leg 21 is in registration with a pair of apertures 22 provided in the rear section horizontal leg 21 after which bolt 23 is passed through each set of registering apertures 22. Lock nuts 24 are then threaded onto the bolts 23 to firmly secure the front and rear sections 18 and 19 in their assembled, length-adjusted relationship.

As evidenced from viewing FIG. 2, the vertically disposed leg or flange 20 of each of the front and rear sections 18, 19 respectively of both of the sill members 14 and 15 is also provided with a plurality of longitudinally spaced apertures 25 therethrough and, like the spacing of apertures 22 of the front and rear section flanges 21, the interval or longitudinal distance between adjacent apertures 25 formed through the vertical flange 20 of the front section 18 is substantially the same as the interval between adjacent apertures 23 provided in the vertical flange 20 of the rear section 19. Thus, whenever a pair of apertures 22 in the front section horizontal flange 21 is in registration with a pair of apertures 22 provided in the rear section horizontal flange 21 and, hence, to establish a particular length-adjusted relationship of a side sill member 14, 15, at least a pair of apertures 25 in the front section vertical flange 20 are also in registration with a pair of apertures 25 provided in the rear section vertical flange 20. This relationship of the apertures 22 and 25 and their orientation with respect to the flanges 20 and 21 of the front and rear sections 18 and 19 is clearly illustrated in FIG. 2. Accordingly, if desired additional bolts 26 similar to bolts 23 may be inserted through any set of registering apertures 25 so as to provide additional means for securing the front and rear sections 18 and 19 in their assembled, length adjusted relationship. However, the registering apertures 25 in the vertical flanges 20 are utilized primarily for other purposes, as will be pointed out hereinafter.

The front end sill member 16 and the rear end sill member 17 are constructed in substantially the same manner. As pointed out hereinbefore, the sill members 16 and 17 are longitudinally adjustable individually whereby the width of the assembled chair support frame 10 may be selectively varied. Each front and rear end sill member 18, 19, respectively, comprises three basic components, namely, a pair of elongated end sections 27 and an intermediate center section 28. Like the front and rear sections 18, 19 of the side sill members 14, 15, the end sections 27 and center sections 28 of the front and rear end side sill members 16 and 17 are preferably made of angle iron bar stock so that in vertical section they are substantially L-shaped.

As shown in FIG. 2, one end of each front end sill member end section 27 is rigidly secured as by welding, to the forward end portion of the front end section 18 of a respective side sill member 14, 15. The rigidly interconnected end section 27 and front section 18 are oriented 90° with respect to each other and serve as a front corner subassembly of the chair support frame 10. In a similar manner, one end of each rear end sill member end section 27 is oriented 90° with respect to and is rigidly connected to the rearwardmost end portion of the rear section 19 of a respective side sill member 14, 15. The horizontally disposed legs or flanges 29, of the front and rear end sill member end sections 27, which extend inwardly, are each provided with a plurality of longitudinally spaced apertures 30 therethrough. The row of apertures 30 of each end section 27 extends substantially the full length of such end section 27. The horizontally disposed flange 31 of each of the front and rear end sill members 16, 17 is also provided with a row of longitudinally spaced apertures 32 therethrough substantially along its entire length. The spacing between adjacent apertures 32 is substantially the same as the spacing between the apertures 30. During the chair support frame 10 assembly operation, a center section 28 is placed over a pair of related end sections 27 so that it bridges the free ends of such end sections 27. The center section 28 is preferably arranged so that equal end portions of the horizontal flange 31 of the center section 28 overlap and abut respective free end portions of the end sections 27, as illustrated in FIG. 2. From the foregoing, it is believed clear the manner in which the lengths of the front and rear end sill members 16, 17, respectively, are individually adjusted. Once the desired transverse spacing of end sections 27 of the front end sill member 16 or the rear end sill member 17 is achieved, a center section 28 is positioned on the spaced end sections 27 so as to bridge the free ends thereof. Suitable bolts 33 are then inserted through at least four apertures 32 of the center section 28 aligned or in registration with two apertures 30 formed through each of the associated end sections 27. Suitable lock nuts (not shown) are then threaded on the bolts 33 for rigidly connecting the end sections 27 and center section together.

In order to reinforce the chair support frame 10 at the two rear corners thereof, a triangularly shaped gusset plate 34 is welded or otherwise suitably secured to each end section 27 of the rear end sill member and a respective one of the rear sections 19 of the side sill members 14, 15.

The front wheel means 11 at each of the front corners of the chair support frame 10 are in the form of a self-steering swivel type caster 34, permitting 360° rotation about a substantially vertical axis and enabling easy manuverability in any direction. The stem or journal of each caster 34 is rotatably supported in a bearing member 35 carried at the forwardmost end of a bracket 36. The brackets 36 are preferably integrally formed with the side sill members 14, 15 and are substantially Z-shaped when viewed in side elevation whereby the legs 37 to which the bearing members 35 are connected are spaced longitudinally forwardly of and vertically above the front end sill member 16. It will be appreciated that such front wheel suspension construction results in chair support frame 10 having a relatively low center of gravity to thereby increase the overall safeth of the wheeled chair support attachment as well as its mobility. Moreover, the chair attachment of the present invention adds very little to the overall height of the seat of the chair used in conjunction with the attachment and placement or removal of a person on or from the chair is facilitated by this fact.

In each of the various embodiments of the invention illustrated in the drawings, the rear wheel means 12 at each of the two rear corners of the chair support frame 10 includes a wheel 38 provided with a rubber tire. The drive wheels 38 are capable of being individually or simultaneously rotated manually and/or electrically, as will be pointed out hereinafter. Each of the drive wheels 38 of the embodiment of the invention shown in FIG. 1 is equipped with an anti-friction bearing unit 39 of conventional design, which, as best shown in FIG. 3, includes an inner and outer bearing races 40, 41, respectively. The outer bearing race 41 of each drive wheel 38 is non-rotatively fixed to the hub portion thereof by any suitable means.

As pointed out hereinbefore, the basic attachment of the present invention includes a chair leg securing means 13 at each of the four corners of the chair support attachment frame 10. Each chair leg securing means 13 includes a generally circular and flat mounting plate 42. One end of a rubber sleeve 43 is bonded or otherwise suitably secured to the mounting plate 42. The rubber sleeve 43 of each chair leg securing means 13 extends vertically upwardly from the mounting plate 42 to which it is secured and serves as a socket for receiving the leg 44 of a conventional household chair 45 therein. Integrally formed with each mounting plate 42 is a tab 46 which extends generally radially therefrom and is provided with a central opening 47 therethrough. The central opening 47 of each chair leg securing means 13 is alignable with any one of the group or series of apertures 30 formed through the horizontal flange 29 of a respective end section 27 as best shown in FIG. 2. A bolt 48 and thumb nut 49 are employed for securing each chair leg securing means 13 to a respective end section 27 in its adjusted position. From the foregoing, it will be appreciated that not only is each chair leg securing means 13 individually adjustable in a transverse direction with respect to the chair leg securing means 13 generally in transverse alignment therewith but it also capable of being swung arcuately about the vertical axis of the bolt 48 associated therewith before the cooperating thumb nut 49 is tightened. Thus, to a limited extent, the longitudinal spacing between the two chair securing means 13 carried the the front end sill member 16 and those secured to the rear end sill member 17 may be selectively adjusted and such longitudinal spacing adjustment feature is in addition to that provided by the shortening and lengthening capability incorporated into the structure and design of the side sill members 14, 15, as pointed out hereinbefore. Also, the transverse spacing being the chair leg securing members 13 mounted on either the front end or rear end sill members may be varied slightly by pivoting such chair leg securing members 13 about the respective bolts 48. It will be appreciated that by providing the three above described adjustment means, namely, the means for selectively adjusting the lengths of the front end, rear end, and side sill members, the means for selectively positioning the chair leg securing means 13 individually along the longitudinal axes of the front and rear end sill members, and the means for individually and horizontally positioning each chair leg securing means 13 with respect to all the other chair leg securing means 13, the chair support frome 10 is readily adaptable to household chairs of innumerable sizes and types. As illustrated in FIG. 5, the chair leg 45 positioned in the sleeve 43 of each chair leg securing means 13 is supported upon the mounting plate 42. An adjustable contractivle and expandible band 50, adapted to encircle the uppermost end portion of the sleeve 43, is employed for causing such sleeve end portion to firmly grip the chair leg 45 and secure the chair leg 45 to the chair support frame 10. Inasmuch as the sleeves 43 are made of rubber or rubber like material, the chiar legs 45 are not marred or damaged in any way by attaching the chair 45 to the chair support frame 10 nor will such use of the chair 45 as a wheel chair, if only temporary, affect its use or appearance as a conventional household chair subsequently. Moreover, the attaching operation can be accomplished quickly and easily and without the need of special tools or the like.

The mechanism at each side of the wheeled chair support attachment of the embodiment of the invention illustrated in FIG. 1 for manually propelling the same is designated in its entirety by reference character 51. Only the propelling mechanism 51 on one side of the shair support attachment will be described in detail but it is to be understood the propelling mechanism 51 on each side of the chair support attachment are substantially mirror images of each other. The manually propelling mechanism 51 includes an elongated casing 52 comprising an outer member 53 and an interfitting inner member 54 which are preferably formed of sheet material or the like. The propelling mechanism 51 also includes an upper pulley 55 and a lower pulley 56 which are driving interconnected by means of a flexible, endless belt 57. It is to be understood that the pulleys 55 and 56 could be in the form of sprockets and the belt 57 provided with teeth for engagement with the teeth of such sprockets without departing from the spirit and scope of the invention. The lower pulley 56 is drivingly connected, in a side-by-side fashion, to a drive wheel 38 by any suitable means whereby the pulley or sprocket 56 and the drive wheel 38 are constrained to rotate together. The drive wheel 38 and pulley 56 are attached to the chair support frame 10 by means of a stub shaft 58 which is preferably in the form of a stud or bolt having one end provided with an enlarged head 59 and its opposite end provided with a threaded section 60. In order to assemble the rear drive wheel 38 and pulley 56 on the stub shaft 58 and to attach the lower end of the casing 52 to the chair support attachment frame 10, a thrust washer 61 is first placed on the stub shaft 58 and caused to abut the enlarged head 58. Thereafter, the pre-assembled drive wheel 38 and pulley 56 are positioned on the stub shaft 58. It is to be understood that the thrust washer 61 only abuts the inner race 40 of the antifriction bearing unit 39 of the drive wheel 38 and does not engage the outer race 41. A cylindrical spacer 62 is placed on the stub shaft 58. The spacer 62 extends through the pulley 56 and one end thereof is adapted to abut the inner race 40 of the antifriction bearing unit 39. The opposite end of the spacer 62 abuts the surface of the inner casing member 54 about the opening 63 formed in such member 54 through which the inner end of the stub shaft 58 extends. The stub shaft 58 also extends through an aperture 64 formed through an enlarged, upstanding tab 65 which may be integrally formed with the vertical leg 20 of a respect rear section 19 or separately fashioned and rigidly secured to such rear section 19. A lock nut 66 is then threaded onto the stub shaft 58 and tightened in order to firmly clamp the inner race 40 of the antifriction bearing unit 39 and the lowermost end of the casing 52 to the enlarged tab 65. The normally lowermost end of the outer casing member 53 is cut away in order to provide adequate clearance for rotation of the drive wheel 38 and the lower pulley 56.

The upper pulley or sprocket 55, which, preferably has a smaller pitch diameter than the lower pulley or sprocket 56, is suitably attached to a relatively large diameter hand wheel 67 whereby the hand wheel 67 and upper pulley 55 are contrained to rotate in unison. The upper pulley 55 and hand wheel 67 are supported for rotation at the normally uppermost end of the casing 52 by means of a stuf shaft 68. The stub shaft 68, like the lower stub shaft 58, described hereinbefore, is in the form of a threaded bolt and is rigidly attached to the casing 52 in a manner similar to manner in which the lower stud shaft 58 is secured to the casing 52 and the tab 65. A spacer 69, through which the stub shaft 68 extends, has one end abutting the inner race 70 of a antifriction bearing unit 71 carried by the hub of the hand wheel 67. The spacer 69 extends through the upper pulley 55 and is adapted to abut the inner side of the inner casing member 54 about the hole 72 through which the innermost end of the stub shaft 68 extends. A lock nut 73 is employed for firmly connecting the stub shaft 68 to the inner casing member 54 and to thereby provide a support for the hand wheel 67 and the upper pulley 55. Suitable means, not shown, may be provided for varying the distance between the stub shafts 58 and 68 to thereby adjust the belt tension. It is also to be understood that the casing members 53 and 54 could be ribbed or suitably reinforced in some other manner in order to enhance its sturdiness and rigidity.

The hand wheel 67 is provided with a transversely outwardly projecting generally cylindrical hand grip 74 which is rotatably supported on a fixed shaft (not shown) carried by the hand wheel 67, as shown in fIG. 2. The hand grip 74 could have the shape of a knob rather than being cylindrical as illustrated in the drawings without departing from the spirit and scope of the invention.

Means are provided for adjusting the vertical position of the hand wheel axis of rotation and for firmly supporting the hand wheel 67 in such adjusted position. The adjustment means includes an elongated brace member 75 which has one end pivotally connected to the outer casing member 53 substantially midway between the axes of rotation of the upper and lower pulleys 55 and 56. The lowermost end of the brace member 75 is adapted to be secured to the vertical flange or leg 20 of a respective side sill rear section 19 at any one of the apertures 25 formed through such flange 20. It will be appreciated that by varying the angle between the longitudinal axis of the casing 52 and the longitudinal axis of the side sill member 14 or 15, the height of the hand wheel axis above the plane of the side, front and rear sill members may be changed. Once the desired vertical positioning of the hand wheel axis is obtained by angularly swinging the casing 52, the lowermost end of the brace member 75 is rigidly connected to the rear section 19 by means of a bolt 76 inserted through an aperture fromed through the lowermost end of the brace member 75 and the particular one of the apertures 25 of the vertical leg 20 which is in registration therewith. A suitable lock nut is employed for detachably securing the brace member to the rear section 19, as shown in FIG. 2.

The chair support frame 10 of the embodiment of the invention illustrated in FIGS. 6 and 7 is constructed in substantially the same manner as the embodiment described hereinbefore with the exception of structure of the rear wheel means 12 and the means for manually propelling the device. As best shown in FIG. 7, each of the rear wheel means 12 includes upstanding standard 77 which is substantially L-shaped in horizontal section so as to provide a side leg 78 and a back leg 79. The lower end of the side leg 78 is rigidly secured to the vertical flange 20 of the side sill member rear section 19 and, similarly, the lower end of the back leg 79 is bolted to the adjacent end section 27. A non-rotatable stub shaft 80 is secured to the uppermost end of the standard 77, as illustrated in FIG. 7. The stub shaft 80 serves as a support for a relatively large, rubbed tired wheel 81 which is mounted thereon. The wheel 81 is provided with a circular hand wheel 82 attached to the outer side thereof. From the foregoing, it is believed clear that the person utilizing the chair support attachment may propel himself about by pushing on the hand wheels 82.

In the embodiment of the invention illustrated in FIGS. 8, 9 and 10 electric means are provided for propelling the chair support attachment in lieu of the manually operable means of the two embodiments described hereinbefore. In essence, the electric propulsion means includes a rechargeable electric storage battery 83 which is supported upon a generally rectangular tray or the like 84 rigidly secured to the center section 28 of the rear end sill member 17. Each of the rear wheel means 12 of the present embodiment of the invention includes a drive wheel 85 which is toratably supported on a stub shaft 86 carried by the tab 65. Fixed to the inner face of the drive wheel 85 is a gear 87. A Motor-speed reducer unit 88 is suitably supported on each of the end sections 27 of the rear end sill member 17. The output shaft 89 of each motor-speed reducer unit 88 is provided with a drive gear 90, which, in turn, meshes with a driven dear 87 fixed to a respective one of the rear drive wheels 85.

The rotational direction of the output shaft 89 of the electric motor-speed reducer unit 88 may be reversed by reversing the electric current flow therethrough. Energization of each electric motor-speed reducer unit 88 and drive direction of rotation of its output shaft 89 is controlled by means of simple electric control circuit and switch control box 91. The switch control box 91 may be held by the person using the chair support attachment or suitably attached to the motor-speed mounted units the chair support attachment so box 91 be readily and conveniently positioned for operation by such person. Projecting from the switch control box are a pair of pivotally mounted levers 92 and 93. Lever 92 is utilized to control energization and the direction of rotation of the electric motor-speed reducer unit 88 associated with one of the drive wheels 85 while the other lever 93 controls the operation of the electric motor-speed reducer unit 88 associated with the drive wheel 85 on the opposite side of the attachment from 10. While the electric circuit means which includes the battery 83, electric motro-speed reducer units 88 and the switch control box 91 will not be described in detail, it is to be understood that when the control levers 92, 93 are disposed generally upright with respect to the top surface of the switch control box 91 and in neutral positions, neither electric motor-speed reducer unit 88 is energized. However, if either lever is pivoted to a forward position, the electric motor-speed reducer unit 88 controlled by such lever with cause rotation of the drive wheel 85 associated therewith to turn in a direction to propel the chair support frame 10 in a forward direction. Conversely, if either lever is moved to a rearward position, the electric motor-speed reducer unit 88 controlled by such lever will effect rotation of the drive wheel 85 in an opposite direction.

Preferably, the electrical storage battery 83 is of type having built in recharging means so that during the periods when the chair support attachment is not being used, the battery 83 may be recharged merely by connecting the same to a source of electric energy by means of a simple extention cord 94 or the like.

Figure 12:
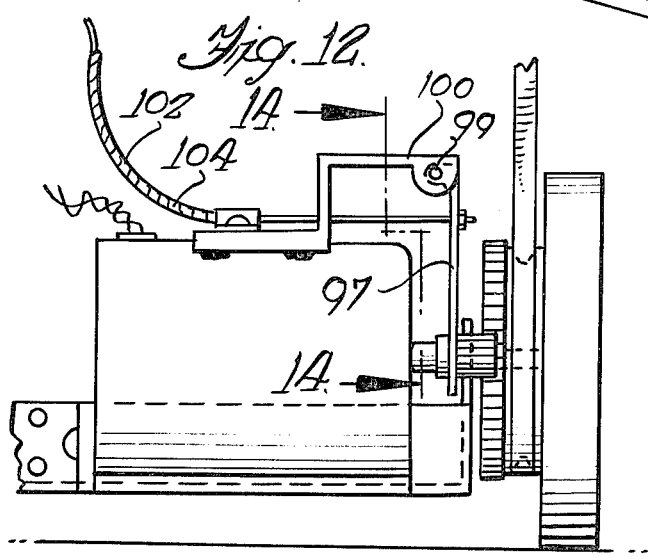
FIG. 12 is a rear elevational view of a portion of the structure illustrated in FIG. 11.
Figure 14:
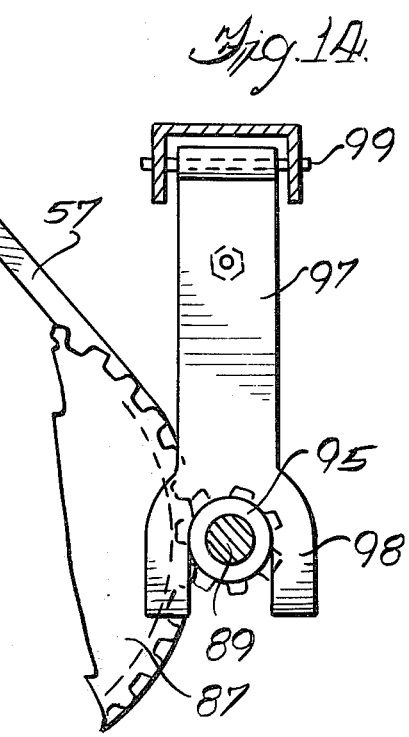
FIG. 14 is a sectional view taken substantially along line 14—14 of FIG. 12.
Figure 13:
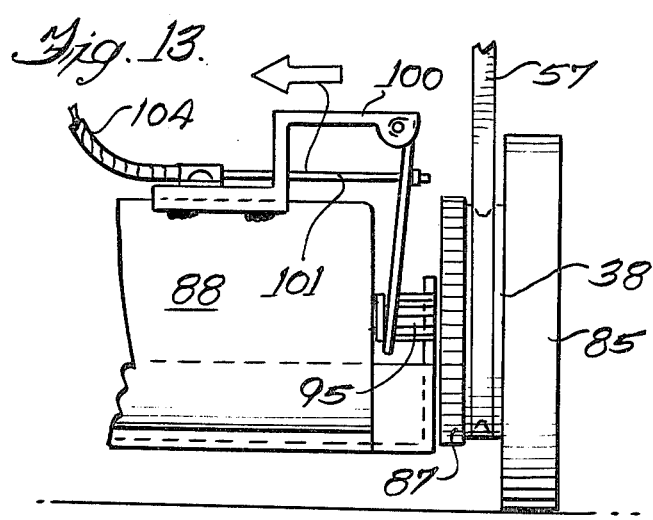
FIG. 13 is a view similar to FIG. 12 showing the structure in a second operational condition.

The chair support frame 10 of the embodiment of the invention illustrated in FIG. 11 may be selectively propelled manually or electrically. In essence, the propulsion means of the FIG. 11 embodiment of the invention is similar structurally and functionally to both the manual propulsion mechanism 51 described hereinbefore with reference to the embodiment of the invention shown in FIG. 1 and the electric propulsion means described in detail above with reference to the embodiment of the invention illustrated in FIG. 8. Consequently, the description of those components (and the manner in which such components function and are assembled together) which have already been described in detail and which are also found in the FIG. 11 embodiment of the invention will not be further described. As best shown in FIG. 12, driven gear 87, instead of being fastened directly to the side of the drive wheel 85 as in the FIG. 8 embodiment of the invention, is suitably secured to the lower pulley 56 which, in turn, is securely fastened to the side of the drive wheel 85. Moreover, the drive gear 95 is mounted on the electric motor-speed reducer output shaft 89 for relative axial sliding movement rather than being axially fixed thereto as is the drive gear 90 of the FIG. 8 embodiment of the invention. The drive gear 95 is slidable between an operative position wherein it is in meshing engagement with the driven gear 87, as shown in FIG. 12, and in inoperative or disengaged position wherein it is out of meshing engagement with the driven gear 87, as shown in FIG. 13. Shifting of the drive gear 95 is accomplished by means of a manually operated control linkage, designated generally by reference numeral 96. The control linkage 96 includes a shift fork 97 which has a bifurcated end 98 disposed within a groove provided in a hub portion integrally formed on one end of the slidable gear 95 whereby the gear 95 is capable of rotating with respect to the shaft fork 97. The shift fork 97 is supported for swinging movement about a pivot pin 99 carried at one end of a substantially Z-shaped bracket 100. The bracket 100 is suitably mounted upon the electric motor-speed reducer unit 88. One end of the inner cable 101 of a Bowden wire assembly 102 is fastened to the shift fork 97 intermediate its ends and the opposite end thereof is provided with a control knob 103 to facilitate sliding of the inner cable 101 with respect to its outer sheathing 104 in order to effect swinging of the shift fork 97 between the positions shown in FIGS. 12 and 13. Preferably, the knobend of the Bowden wire assembly 102 is mounted on the upper end of the casing 52 so as to be conveniently available for operation of the shift fork 97. From the foregoing, it is believed the operation of the propulsion means of the FIG. 11 embodiment of the invention is clear. With the drive gear 95 is meshing engagement with the driven gear 87, the chair support frame attachment may be propelled electrically. However, if desired, the electric propulsion means may be operatively disconnected from drive wheel 85 and the chair support frame attachment may be propelled manually.

The chair support frame 10 is provided with a retractible foot rest 105, which is best shown in FIG. 2. The foot rest 105 is in the form of a generally rectangular flat plate which is supported substantially midway between the side sill members 14, 15 for longitudinal movement as indicated by the arrow 106. The foot rest 105 is slidable between an extended, operative position, as shown in FIG. 2, wherein a person sitting on the chair may place his feet thereon to support them, and a retracted, inoperativve position, not shown. It is to be understood that when the foot rest 105 is in its retracted position, a person may be readily placed on or removed from the chair without interference by the foot rest 105. Sliding of the foot rest 105 between its extended operative and retracted, inoperative positions is accomplished by means of a single hand control lever 107. The lever 107 is pivotally supported on side sill member 14. The uppermost end of the control lever 107 is a position to be readily grasped by a person sitting on the chair to manipulate the same. One end of a like 108 is pivotally connected to the lowermost end of the control lever 107 and the opposite end thereof is pivotally connected to a portion of a lever 109 intermediate its ends. The lever 109, in turn, has one end pivotally connected to the side sill member 14 and its opposite end pivotally connected to the rear end of the foot rest 105 by any suitable means. It is to be understood that upon forward swinging of the control lever 107 from the position shown in FIG. 2, the foot rest 105 will be moved to its retracted, inoperative position. Therafter, swinging of the control lever 107 in a reverse direction will cause the foot rest 105 to return to the position illustrated in FIG. 12.

If desired, each of the drive wheels 38 or 85 may be provided with a hand operated brake means. Each brake means includes a substantially L-shaped lever 110. The relatively longer leg 111 of the lever 110 is pivotally connected to the casing 52, as shown in FIG. 2. The relatively shorter leg 112, of each lever 110 projects transversely outwardly. Each of the legs 112 is movable into and out of frictional engagement with the tire of a respective drive wheel 38 or 85 upon swinging of lever leg 111 associated therewith. The uppermost ends of the brake levers 110 are, like the uppermost end of the hand control lever 107, in positions where they may be readily manipulated to apply and release braking forces on the drive wheels 38 or 85.

The embodiments of the invention chosen for the purposes of illustration and description herein are those preferred for achieving the objects of the invention and developing the utility thereof in the most desirable manner, due regard being had to existing factors of economy, simplicity of design and construction, production methods, and the improvements sought to be effected. It will be appreciated therefore, that the particular structural and functional aspects emphasized herein are not intended to exclude, but rather to suggest, such other modifications and adaptations of the invention as fall within the spirit and scope of the invention as defined in the appended claims.

What is claimed is:

1. A wheeled attachment for converting a chair having leg means into mobile means for transporting non-ambulatory persons, comprising, a generally rectangularly shaped chair support frame lying generally in a horizontal plane having a pair of transversely spaced and parallel, longitudinally extending side sill members, a transversely extending front sill member and a transversely extending rear sill member longitudinally spaced and parallel with respect to said front sill member, one end of each side sill member being rigidly connected to a respective end of said front sill member and its opposite end rigidly connected to a respective end of said rear sill member; means for individually adjusting the length of each of said front, rear, and side sill members; ground-engaging wheel means at each corner of said chair support frame for supporting said chair support frame in a generally horizontal plane, the rotational axes of said wheel means being vertically spaced above said generally horizontal plane of said chair support frame chair leg supporting and securing means at each corner of said chair support frame, each of said chair leg supporting and securing means being operatively connectible to a respective leg means of a chair and including a generally flat mounting plate for supporting a respective one of the chair leg means, socket means carried by said mounting plate for receiving said respective one of said chair leg means, means for detachably securing said respective one of said chair leg means in said socket means, and means for adjustably securing said mounting plate to a respective one of said front and rear sill members at any one of a plurality of positions along the length thereof independently of said means for individually adjusting the length of each of said front, rear, and side sill members, said mounting plate being substantially horizontally disposed when in use and longitudinally spaced intermediate said wheel means at the two forwardmost corners and said wheel means at the two rearwardmost corners of said chair support frame in all of its adjusted positions.

2. A wheeled attachment as set forth in claim 1, wherein each of said ground-engaging wheel means at each of the two forwardmost corners of said chair support frame includes a bracket integrally formed with a respective one of said side sill members and extending longitudinally forwardly therefrom, said brackets being substantially Z-shaped in side elevation so as to provide a pair of substantially horizontally disposed, vertically spaced and parallel legs, a first one of said bracket legs lying substantially in said horizontal plane of said chair support frame and a second one of said bracket legs being vertically spaced above said horizontal plane, and a swivel-type caster carried by said second one of said bracket legs, said caster being capable of pivoting 360° about a substantially vertical axis.

3. A wheeled attachment as set forth in claim 2, wherein each of said socket means includes an elongated rubber sleeve having one end secured to a respective one of said flat mounting plates and extending generally vertically therefrom, and wherein said means for adjustably securing said mounting plate to a respective one of said front and rear sill members at any one of a plurality of positions along the length thereof additionally includes means for further individually adjusting the longitudinal and transverse position of said rubber sleeve associated therewith at each of said plurality of adjusted positions of said mounting plate.

4. A wheeled attachment as set forth in claim 2, further including drive means for individually and selectively rotating each of said wheel means at each of the two rearwardmost corners of said chair support frame in forward and reverse directions.

5. A wheeled attachment as set forth in claim 4, wherein said wheel means at each of the two rearwardmost corners of said chair support frame includes a generally upright standard having its lowermost end rigidly secured to said chair support frame at the intersection of a respective side sill member and said rear sill member, said standard extending generally vertically from said chair support frame and carrying a transversely extending stub shaft at its uppermost end, and a ground-engaging rear wheel rotatably supported on said stub shaft; and said drive means includes a hand wheel of less diameter than said rear wheel and secured to said rear wheel on the exteriorly facing side thereof whereby the wheeled attachment may be manually propelled by the chair occupant.

6. A wheeled attachment as set forth in claim 4, wherein each of said drive means includes a transversely outwardly projecting stub shaft at each of the two rearwardmost corners of said chair support frame, a ground-engaging rear wheel rotatably supported on said stub shaft; and wherein each of said drive means for rotating each rear wheel includes a manually-operable mechanism.

7. A wheeled attachment as set forth in claim 6, further including a manually operable brake means associated with each of said rear wheels for preventing rotation thereof.

8. A wheeled attachment as set forth in claim 4, wherein each of said drive means includes a transversely outwardly projecting stub shaft at each of the two rearwardmost corners of said chair support frame, a ground-engaging rear wheel rotatably supported on said stub shaft; and wherein each of said drive means for rotating each rear wheel includes electrically driven power means and power transmission means operatively interconnecting said electrically driven power means and a respective on of said rear wheels.

9. A wheeled attachment as set forth in claim 8, including manually operable control means operatively connected to said power transmission means for selectivvely rendering said power transmission means effective and ineffective for operatively interconnecting said electrically driven power means and said respective one of said rear wheels; and wherein each of said drive means for rotating each rear wheel further includes a manually-operable mechanism capable of being operated independently of said electrically driven power means.

10. A wheeled attachment for converting a chair having leg means into mobile means for transporting nonambulatory persons, comprising, a generally rectangularly shaped chair support frame having a pair of transversely spaced and parallel, longitudinally extending side sill members, a transversely extending rear sill member longitudinally spaced and parallel with respect to said front sill member, one end of each side sill member being rigidly connected to a respective end of said front sill member and its opposite end rigidly connected to a respective end of said rear sill member; chair leg supporting and securing means at each corner of said chair support frame, each of said chair leg supporting and securing means being operatively connectible to a respective leg means of a chair, each of said chair leg supporting and securing means at each corner of said chair support frame including a generally flat mounting plate for supporting a respective one of the chair leg means, socket means carried by said mounting plate for receiving said respective one of said chair leg means, means for detachably securing said respective one of said chair leg means in said socket means, and means for adjustably securing said mounting plate to a respective one of said front and rear sill members at any one of a plurality of positions along the length thereof, said mounting plate being substantially horizontally disposed when in use; means for individually adjusting the length of each of said front, rear, and side sill members; ground-engaging wheel means at each corner of said chair support frame for supporting said chair support frame in a generally horizontal plane, the rotational axes of said wheel means being vertically spaced above said generally horizontal plane of said generally horizontal plane of said chair support frame, each of said ground-engaging wheel means at each of the two forwardmost corners of said chair support frame including a bracket integrally formed with a respective one of said side sill members and extending longitudinally forwardly therefrom, said brackets being substantially Z-shaped in side elevation so as to provide a pair of substantially horizontally disposed, vertically spaced and parallel legs, a first one of said bracket legs lying substantially in said horizontal plane of said chair support frame and a second one of said bracket legs being vertically spaced above said horizontal plane, and a swivel-type caster carried by said second one of said bracket legs, said caster being capable of pivoting 360° about a substantially vertical axis; and drive means for individually and selectively rotating each of said wheel means at each of the two rearwardmost corners of said chair support frame in forward and reverse directions, each of said means including a transversely outwardly projecting stub shaft at each of the two rearwardmost corners of said chair support frame, a ground-engaging rear wheel rotatably supported on said stub shaft, and each of said drive means for rotating each rear wheel including electrically driven power means and power transmission means operatively interconnecting said electrically driven power means and a respective one of said rear wheels, each of said electrical power means including, a reversible electric motor-speed reducer unit mounted on said rear sill member at a respective end thereof, and said power transmission means including a driven gear fixed to the interiorly facing side of a respective one of said rear wheels, and a drive pinion gear in meshing engagement with said driven gear, said drive pinion gear being drivingly connected to the output shaft of said electric motor-speed reducer unit.

11. A wheeled attachment as set forth in claim 10, further including a source of electrical energy for supplying both of said electric motor-speed reducer units with electrical energy, said source of electrical energy being in the form of a storage battery supported on said rear sill member substantially midway between the ends thereof.

12. A wheeled attachment as set forth in claim 10, including manually operable control means operatively connected to said drive pinion gear for selectively moving said drive pinion gear into and out of meshing engagement with said driven gear; and wherein each of said drive means for rotating each rear wheel further includes manually operable power means and power transmission means operatively interconnecting said manually operable power means and a respective one of said rear wheels, said power transmission means including a rotatable driven member drivingly connected to a respective one of said rear wheels, a rotatable drive member spaced from said driven member, and an endless power transmitting means trained around and drivingly interconnecting said drive and driven members; and said manually operable power means includes a manually rotatable hand wheel operatively connected to said drive member whereby said hand wheel and drive member are rotatable in unison, means for supporting said hand wheel and drive member are rotatable in unison, means for supporting said hand wheel and drive member for rotation about a transversely extending, substantially horizontal axis, and hand grip means carried by said hand wheel to facilitate rotation of the same.

13. A wheeled attachment for converting a chair having leg means into mobile means for transporting non-ambulatory persons, comprising, a generally rectangularly shaped chair support frame having a pair of transversely spaced and parallel, longitudinally extending side sill members, a transversely extending front sill member and a transversely extending rear sill member longitudinally spaced and parallel with respect to said front sill member, one end of each side sill member being rigidly connected to a respective end of said front sill member and its opposite end rigidly connected to a respective end of said rear sill member; chair leg supporting and securing means at each corner of said chair support frame, each of said chair leg supporting and securing means being operatively connectible to a respective leg means of a chair, each of said chair leg supporting and securing means at each corner of said chair support frame including a generally flat mounting plate for supporting a respective one of the chair leg means, socket means carried by said mounting plate for said said respective one of said chair leg means, means for detachably securing said respective one of said chair leg means in said socket means, and means for adjustably securing said mounting plate to a respective one of said front and rear sill members at any one of a plurality of positions along the length thereof, said mounting plate being substantially horizontally disposed when in use; means for individually adjusting the length of each of said front, rear, and side sill members; and ground-engaging wheel means at each corner of said chair support frame for supporting said chair support frame in a generally horizontal plane, the rotational axes of said wheel means being vertically spaced above said generally horizontal plane of said chair support frame, each of said ground-engaging wheel means at each of the two forwardmost corners of said chair support frame includes a bracket integrally formed with a respective one of said side sill members and extending longitudinally forwardly therefrom, said brackets being substantially Z-shaped in side elevation so as to provide a pair of substantially horizontally disposed, vertically spaced and parallel legs, a first one of said bracket legs lying substantially in said horizontal plane of said chair support frame and a second one of said bracket legs being vertically spaced above said horizontal plane, and a swivel-type caster carried by said second one of said bracket legs, said caster being capable of pivoting 360° about a substantially vertical axis; and drive means for individually and selectively rotating each of said wheel means at each of the two rearwardmost corners of said chair support frame in forward and reverse directions, each of said drive means including a transversely outwardly projecting stub shaft at each of the two rearwardmost corners of said chair support frame, a ground-engaging rear wheel rotatably supported on said stub shaft, and each of said drive means for rotating each rear wheel including a manually-operable mechanism, each of said drive means for rotating each rear wheel including manually operable power means and power transmission means operatively interconnecting said manually operable power means and a respective one of said rear wheels, said power transmission means including a rotatable driven member fixed to the interiorly facing side of a respective one of said rear wheels, a rotatable drive member spaced from said driven member, and endless power transmitting means trained around and drivingly interconnecting said drive and driven members, said manually operable power means including a manually rotatable hand wheel operatively connected to said drive member whereby said hand wheel and drive member are rotatable in unison, means for supporting said hand wheel and drive member for rotation about a transversely extending, substantially horizontal axis, and hand grip means carried by said hand wheel to facilitate rotation of the same.

14. A wheeled attachment as set forth in claim 13, wherein said means for supporting said hand wheel and drive member about a transversely extending, substantially horizontal axis includes an elongated casing substantially enclosing said drive and driven members and said endless power transmitting means, and a stub shaft carried by said casing adjacent the normally uppermost end thereof for rotatably supporting said drive member and said hand wheel, said casing being angularly adjustable about the rotational axis of the rear wheel with which it is associated to a plurality of angular postions with respect to said generally horizontal plane of said chair support frame and releasable securing means for rigidly securing said casing in each of said angularly adjusted positions.

15. A wheeled attachment as set forth in claim 14, wherein said releasable securing means includes an elongated brace means having one end pivotally connected to said casing at a point intermediate its ends, and means for detachably connecting the other end of said brace means to a respective one of said side sill members at any one of a plurality of points spaced along the longitudinal axis of said side sill member.

16. A wheeled attachment as set forth in claim 14, wherein said drive and driven members are in the form of pulley sheaves and said endless power transmitting means is an endless, flexible belt, said driven pulley sheave having a pitch diameter larger than the pitch diameter of said drive pulley sheave.

17. A wheeled attachment for converting a chair having leg means into mobile means for transporting non-ambulatory persons, comprising, a generally rectangularly shaped chair support frame having a pair of transversely spaced and parallel, longitudinally extending side sill members, a transversely extending front sill member and a transversely extending rear sill member longitudinally spaced and parallel with respect to said front sill member, one end of each side sill member being rigidly connected to a respective end of said front sill member and its opposite end rigidly connected to a respective end of said rear sill member; chair leg supporting and securing means at each corner of said chair support frame, each of said chair leg supporting and securing means being operatively connectible to a respective leg means of a chair, each of said chair leg supporting and securing means at each corner of said chair support frame including a generally flat mounting plate for supporting a respective one of the chair leg means, socket means carried by said mounting plate for receiving said respective one of said chair leg means, means for detachably securing said respective one of said chair leg means in said socket means, and means for adjustably securing said mounting plate to a respective one of said front and rear sill members at any one of a plurality of positions along the length thereof, said mounting plate being substantially horizontally disposed when in use; ground-engaging wheel means at each corner of said chair support frame in a generally horizontal plane, the rotational axes of said wheel means being vertically spaced above said generally horizontal plane of said chair support frame, each of said ground-engaging wheel means at each of the two forwardmost corners of said chair support frame includes a bracket integrally formed with a respective one of said side sill members and extending longitudinally forwardly therefrom, said brackets being substantially Z-shaped in side elevation so as to provide a pair of substantially horizontally disposed, vertically spaced and parallel legs, a first one of said bracket legs lying substantially in said horizontal plane of said chair support frame and a second one of said bracket legs being vertically spaced above said horizontal plane, and a swivel-type caster carried by said second one of said bracket legs, said caster being capable of pivoting 360° about a substantially vertical axis; means for individually adjusting the length of each of said front, rear, and side sill members; and a generally rectangularly shaped and horizontally disposed foot rest, means for supporting said foot rest on said chair support frame for longitudinal sliding movement between a retracted position wherein the forwardmost edge of said foot rest is closely adjacent said front sill member and an extended position wherein said forwardmost edge of said foot rest is longitudinally spaced forwardly of said front sill member, and manually operable means for moving said foot rest between its retracted and extended positions.

* * * * *